(12) United States Patent
Frank et al.

(10) Patent No.: US 11,511,416 B2
(45) Date of Patent: Nov. 29, 2022

(54) METHOD AND APPARATUS FOR MONITORING AN ACCELERATION OF AN AXIS OF A MULTI-AXIS KINEMATIC SYSTEM

(71) Applicant: SIEMENS AKTIENGESELLSCHAFT, Munich (DE)

(72) Inventors: Matthias Frank, Erlangen (DE); Ran Gao, Erlangen (DE); Bernd Quaschner, Grossenseebach (DE); Maximilian Walter, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 328 days.

(21) Appl. No.: 16/862,031

(22) Filed: Apr. 29, 2020

(65) Prior Publication Data

US 2020/0346345 A1 Nov. 5, 2020

(30) Foreign Application Priority Data

Apr. 30, 2019 (EP) ..................................... 19171868

(51) Int. Cl.
*B25J 9/16* (2006.01)
*B25J 17/02* (2006.01)

(52) U.S. Cl.
CPC ......... *B25J 9/1651* (2013.01); *B25J 17/0258* (2013.01); *B25J 9/1674* (2013.01)

(58) Field of Classification Search
CPC .... B25J 9/1651; B25J 17/0258; B25J 9/1674; G05B 2219/43058; G05B 2219/43062;

(Continued)

(56) References Cited

U.S. PATENT DOCUMENTS

2005/0033459 A1* 2/2005 Otsuki ................. G05B 19/416
700/71
2015/0057799 A1 2/2015 Ueberle et al.
(Continued)

FOREIGN PATENT DOCUMENTS

EP 2113344 11/2009
EP 2839934 2/2015

OTHER PUBLICATIONS

EP Search Report dated Oct. 22, 2019 based on EP19171868 filed Apr. 30, 2019.

*Primary Examiner* — Abby Y Lin
*Assistant Examiner* — Dylan M Katz
(74) *Attorney, Agent, or Firm* — Cozen O'Connor

(57) ABSTRACT

A method for monitoring acceleration of a number A of axes of a multi-axis kinematic system utilizes a sampling process with a first sampling interval, wherein a first acceleration limit value assigned to the first sampling interval and a second different acceleration limit value is determined for the acceleration, where a second time interval is assigned to the second acceleration limit value, a plurality of position values of the axis is determined by sampling with the first sampling interval, a current acceleration is calculated via the ascertained position values, and the calculated current acceleration is monitored via a first instance of monitoring utilizing the first acceleration limit value and the assigned first sampling interval and, simultaneously, via a second instance of monitoring utilizing the second acceleration limit value and the assigned second time interval, such that acceleration of an axis is monitored using at least two acceleration limit values simultaneously.

20 Claims, 1 Drawing Sheet

(58) Field of Classification Search
CPC ............ G05B 19/4062; G05B 19/4163; G05B 2219/36521
See application file for complete search history.

(56) References Cited

U.S. PATENT DOCUMENTS

2015/0285834 A1* 10/2015 Shibuya ................. A63B 69/36 702/150
2020/0011710 A1* 1/2020 Müller ............... G01D 5/24461

* cited by examiner

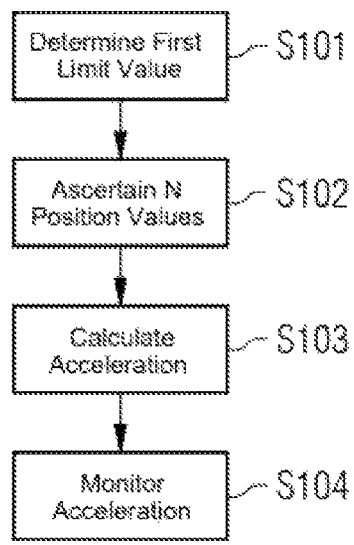
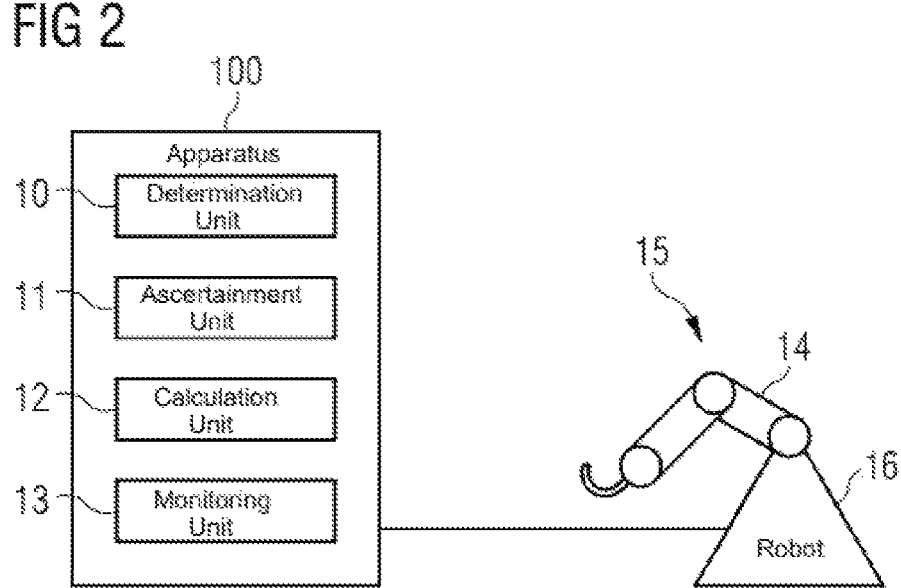

METHOD AND APPARATUS FOR MONITORING AN ACCELERATION OF AN AXIS OF A MULTI-AXIS KINEMATIC SYSTEM

BACKGROUND OF THE INVENTION

1. Field of the Invention

The present invention relates to a method, apparatus and a computer program product for monitoring an acceleration of an axis of a multi-axis kinematic system.

2. Description of the Related Art

A current acceleration of the axis of a multi-axis kinematic system can be monitored in a conventional manner using a function for safely limiting the acceleration ("safety limited acceleration" (SLA), SLA function). Here, a respective position of the axis is sampled at isochronal distances, as a result of which position values are ascertained. The current acceleration of the axis can be estimated from the position values by forming differences. If the monitored, current acceleration of the axis exceeds a previously parameterized acceleration limit value, then the axis is stopped via a suitable safety-related mechanism.

The use of the SLA function is particularly relevant in conjunction with Cartesian speed monitoring of a multi-axis kinematic system, such as within an industrial robot. Here, the position values of a plurality of axes of the industrial robot are ascertained. Then, the current speeds of individual points, such as a flange point, a tool center point (TCP), the articulation positions or corners of workpieces, are calculated therefrom. If the speed of one of these points exceeds a parameterized speed limit, all axes are stopped by a safety-related mechanism.

However, the ascertained position values are discrete values with corresponding discretization errors. Therefore, in relation to the choice of the sampling interval and the calculation of the acceleration, the following interplay arises between the chosen sampling interval, the discretization error and a reaction time of the instance of monitoring.

The longer the chosen sampling interval, the longer the reaction time of the SLA function. However, this reaction time should be as short as possible so that a quick reaction to changes in the speed of the axis can be achieved.

However, the shorter the chosen sampling interval, the greater the influence of the discretization error in the ascertained current acceleration. As a result, a moderate acceleration is slightly underestimated over a plurality of intervals, but then greatly overestimated in one interval. As a consequence, the safety related mechanism is erroneously triggered, resulting in a standstill of the axis. In order to prevent this, the monitored acceleration value needs to lie ever further below the actual desired acceleration limit value, the shorter the sampling interval is chosen to be.

SUMMARY OF THE INVENTION

In view of the foregoing, it is one object of the present invention to improve monitoring of an acceleration of an axis of a multi-axis kinematic system.

This and other objects and advantage are achieved in accordance with the invention by a method for monitoring an acceleration of a number A of axes of a multi-axis kinematic system using at least one sampling process with a first sampling interval is proposed. The method comprises a) determining a first acceleration limit value assigned to the first sampling interval and a second acceleration limit value, differing therefrom, for the acceleration of the axis, where a second time interval is assigned to the second acceleration limit value, b) ascertaining a plurality N of position values of the axis by sampling with the first sampling interval, c calculating at least one current acceleration via the ascertained N position values, and d) monitoring the calculated current acceleration via a first instance of monitoring using the first acceleration limit value and the assigned first sampling interval and, at the same time, via a second instance of monitoring using the second acceleration limit value and the assigned second time interval.

The method in accordance with the invention simultaneously monitors the acceleration of an axis using at least two acceleration limit values, specifically the first acceleration limit value and the second acceleration limit value, which have different sampling intervals or time intervals.

This is advantageous because the simultaneous monitoring via the at least two acceleration limit values realizes axial acceleration monitoring which, firstly, is accurate so as to avoid an unwanted shutdown while, secondly, the acceleration monitoring of the present method has a sufficient reaction time to be able to identify any inadmissible acceleration of the axis in timely fashion before the speed of the points to be monitored has increased to an inadmissible value.

In the present disclosure, a sufficient reaction time is understood to mean, in particular, that the reaction time is firstly established to be so short that the speed of the points to be monitored does not increase to such an extent within the reaction time that the desired limit value is exceeded if an acceleration limit value is suddenly significantly exceeded on account of an uncontrolled maximum acceleration of the axis.

Additionally, the reaction time is secondly set to be so long that the acceleration limit value or values being slightly exceeded, as may be caused by a programming error during the motion control, for example, can be tested with greater accuracy in order to thereby avoid an unwanted shut down and/or stopping of the axes.

In particular, the reaction time is a processing time or a delay time, which is caused by virtue of a safety-related controller initially processing the position values of the axes obtained and then requiring a certain amount of time to react in the case of a fault and then transmit a control signal back to the axes so that the axes can be stopped in situ, i.e., at the location of the axis or the machine. Therefore, the speed limit value calculated from the position values at the safety-related controller preferably lies below the actual admissible speed limit value. This ensures that the speed limit value is not even exceeded if the axis or the multi-axis kinematic system is still accelerated further or accelerates further during the reaction time. In particular, the reaction time is determined by a measurement.

The axis is preferably formed as a rotational axis, a linear axis, a rotary axis, a longitudinal axis, a transverse axis, a perpendicular axis or a vertical axis. In particular, the axis is rotatably mounted and can be driven via a control apparatus, in particular the safety-related controller. The axis can rotate and/or move in one direction or in an opposite direction.

Preferably, the axis is formed as a joint of a machine, such as a robotic arm or part of a robotic arm, for example. Here, the robot particularly comprises an industrial robot. By way of example, the machine is a universal, programmable machine for handling, assembling and/or processing of workpieces.

In the present disclosure, a sampling interval, in particular the first sampling interval, is understood to mean an interval at which a plurality N of position values of the axis are ascertained via sampling. Preferably, the axis is sampled at isochronal distances with the first sampling interval. Isochronal sampling means, in particular, that the axis is sampled at fixed temporal distances. By way of example, this means that a new position value of the axis is obtained every 10 ms in the case of a first sampling interval of $T_1=10$ ms. By way of example, a first position value is ascertained at the time $t_1=10$ ms, a second position value at the time $t_2=20$ ms, a third position value at the time $t_3=30$ ms, etc.

In particular, a position value is a value that specifies a certain axis position of the axis at a certain sampling time by means of the sampling interval. If the axis moves, in particular rotates, the axis position changes at each further time of sampling, and consequently different position values arise. Preferably, the ascertained position values are discrete values.

An acceleration limit value, in particular the first acceleration limit value and the second acceleration limit value, is understood in the present disclosure to mean a limit value that is ascertained, determined, calculated or set and used to monitor the current acceleration. In particular, the current acceleration is monitored via the first instance of monitoring and the second instance of monitoring, where the first instance of monitoring and the second instance of monitoring are carried out simultaneously and/or in parallel.

In accordance with one embodiment, step d) comprises comparing the calculated current acceleration, in each case with the first acceleration limit value used in the first instance of monitoring and with the second acceleration limit value used in the second instance of monitoring in order to ascertain whether the calculated current acceleration exceeds the first and/or the second acceleration limit value.

In accordance with a further embodiment, an action is performed in step e) depending on whether the calculated current acceleration exceeds the first and/or the second acceleration limit value, where the action comprises at least a stopping of the axis.

In particular, the action is performed if the calculated current acceleration exceeds the first and/or the second acceleration limit value. Preferably, stopping the axis comprises the three stop categories pursuant to the DIN EN 60204-1 standard.

In accordance with a further embodiment, the plurality N of position values of the axis, with $N \geq 3$, are ascertained in step b) by sampling with the first sampling interval, where the ascertainment of the plurality N of position values is performed using at least one position encoder.

The position encoder, also referred to as an encoder, also as rotational encoder or rotational angle encoder in the case of rotational axes, and also as a linear encoder in the case of linear axes, is a sensor that outputs position values or changes therein as digital signals, which are subsequently decoded and processed further via an evaluation unit. In the case of rotational axes, position encoders capture a rotational angle or the change therein at an axis and/or a shaft relative to a stationary part. In the case of linear axes, position encoders capture an axis position or the change therein at an axis relative to a stationary part. The position encoder is preferably fastened to the drive of the axis, such as an electric motor of the axis, for example. The position encoder can use photoelectric, magnetic or non-magnetic sampling.

In accordance with a further embodiment, the second acceleration limit value in step a) is determined based on the first acceleration limit value and the first sampling interval.

In accordance with a further embodiment, the current acceleration in step c) is calculated via the ascertained plurality N of position values, with $N \geq 3$, where the current acceleration is calculated based on a calculated difference between a first and a second calculated speed value and of the first sampling interval and/or the second time interval.

In accordance with a further embodiment, the first and the second speed value are each calculated from the plurality N of position values, where the position values of mutually adjacent sampling values of a sampling sequence are ascertained via sampling with the first sampling interval.

In particular, the first speed value $v_1$ is calculated by calculating a difference between two adjacent position values $P_1$ and $P_2$ from the plurality N as position values. The first speed value $v_1$ preferably specifies the speed present between the two adjacent position values or sampling points. The calculated difference is divided by the first sampling interval $T_1$ in order to thus obtain the first speed value $v_1$. The second speed value $v_2$ is calculated in analogous manner. Here, a difference is calculated between two adjacent position values $P_2$ and $P_3$ from the plurality N of position values. The difference calculated thus is divided by the second time interval $T_2$ in order to thus obtain the second speed value $v_2$.

The current acceleration is calculated, in particular, by calculation of a difference between two adjacent speed values $v_1$ and $v_2$ and by division by the first sampling interval $T_1$ and/or the second time interval $T_2$.

In particular, mutually adjacent sampling values of a sampling sequence are sampling values or position values which are obtained temporally in succession in a sequence and in the case of which there are no gaps within the sampling. By way of example, five position values are obtained with a first sampling interval with $T_1=10$ ms. The position values are respectively ascertained at the times $t_0=0$ ms, $t_1=10$ ms, $t_2=20$ ms, $t_3=30$ ms and $t_4=40$ ms. There are no time intervals which are not sampled between these position values. Consequently, the position values are ascertained adjacent to one another in a successively arranged temporal sequence.

In accordance with a further embodiment, the second time interval is formed as a second sampling interval, in which a plurality M of position values of the axis are ascertained via sampling with the second sampling interval, with $M \geq 3$. In particular, the second time interval comprises the second sampling interval. Preferably, the second sampling interval differs from the first sampling interval.

Monitoring of the at least one current acceleration via simultaneous monitoring by the first instance of monitoring and the second instance of monitoring is explained in more detail below on the basis of mathematical formulas and relationships, for the purposes of an improved understanding.

In the following example, the multi-axis kinematic system comprises four axes, for example, four robotic joints, in particular. A Cartesian speed limit value $v_{G\_K}$ is set at 250 mm/s here.

Furthermore, a parametric speed limit value $v_{G\_P}=200$ mm/s is specified. $v_{G\_P}$ preferably is a speed value that is below the Cartesian speed limit value $v_{G\_K}$ so that a speed margin for the reaction of the machine on account of the reaction time of the machine is still present. Therefore, the speed margin $v_D$ between the Cartesian speed limit value $v_{G\_K}$ and the parameterized speed limit value $v_{G\_P}$ is $v_D=v_{G\_K}-v_{G\_P}=250$ mm/s–200 mm/s=50 mm/s in this case.

Further, the reaction time of the Cartesian speed monitoring via the Cartesian speed limit value $v_{G\_K}$ is set as $t_R=50$ ms. What follows herefrom, particularly in the present disclosure with four axes, is that if a Cartesian acceleration does not exceed a Cartesian acceleration limit value of $a_{G\_K}=v_D/t_R=50$ mm/s/50 ms=1000 mm/s$^2$ then the Cartesian speed monitoring still reacts in timely manner in all cases. This is due to the fact that the acceleration of each of the axes $a_{Achse}$ is limited to 250 mm/s$^2$. Hence, this yields a Cartesian overall acceleration limit value of 1000 mm/s$^2$.

Additionally, the assumption is made, in particular, that one of the four axes is a linear axis, the position value of which is sampled to within an accuracy of 0.5 μm.

Consequently, the discretization error for the ascertained position value is $e_p$=0.25 μm (see formula (1.0)):$2·e_p$=2·0.25 μm).

Consequently, in order to monitor the first acceleration limit value $a_{G1}$=250 mm/s$^2$ of this axis, the discretization error in the calculated acceleration $e_a$ must be no more than 10 mm/s$^2$. Thus, if the actual acceleration does not exceed the value of 240 mm/s$^2$, unwanted shutdowns are avoided.

Now, the first sampling interval $T_1$ is determined below based on the Cartesian speed limit value $v_{G\_K}$. Here, the following relationships, in particular, apply:

Discretization error in the calculated axis speed $e_v$:

$$e_v = (2·e_p)/T_1 \quad (1.0)$$

Discretization error in the calculated axis acceleration $e_a$:

$$e_a = (2·e_v)/T_1 \quad (1.1)$$

Preferably, the calculation of the first sampling interval $T_1$ follows herefrom:

$$T_1 = \sqrt{(4·e_p/e_a)} = \sqrt{4·0.25\mu m/s^2/10000\mu m/s^2} = 10 \text{ ms} \quad (1.2)$$

Consequently, in order to limit the discretization error $e_a$ to 10 mm/s$^2$, the first sampling interval $T_1$ must therefore be no less than 10 ms, in particular.

Furthermore, the assumption is made that the reaction time of a first SLA function is $t_{r\_SLA1}=3.5·T_1=35$ ms.

Therefore, in the case of an inadmissible acceleration $a_1$ of the axis, the axial speed of the axis may rise to the value $v_{D\_1}$, with $v_{D\_1}=35$ ms·$a_1$.

This value $v_{D\_1}$ should be less than the margin $v_D=50$ mm/s from the Cartesian speed monitoring. The following relationship follows herefrom, particularly for the maximum controllable acceleration $a_1$ using the first sampling interval $T_1$:

$$a_1 = (v_D/v_{D\_1}) = (50 \text{ mm/s}/35 \text{ ms}) = 1.428 \text{ m/s}^2 \quad (1.3)$$

Thus, monitoring with the first sampling interval $T_1$=10 ms allows the timely identification of instances where the current acceleration is exceeded only if the axial acceleration lies below a value of $a_1$=1.428 m/s$^2$.

In order to additionally also monitor further axial accelerations, which lie above the value of 1.428 m/s$^2$, for example, a second acceleration limit value $a_2$=1400 mm/s$^2$ is monitored in parallel, i.e., at the same time. Here, the second acceleration limit value at $a_2$=1400 mm/s$^2$ is, in particular, below the maximum controllable acceleration of the first acceleration limit value, which is at $a_1$=1.428 m/s$^2$=1428 mm/s$^2$. Consequently, an overlap of the two instances of monitoring advantageously arises.

The second acceleration limit value is preferably greater than the first acceleration limit value in this case. As a result, it is also possible to work with a shorter sampling interval.

This is due to the fact that the second acceleration limit value is preferably further away from the admissible Cartesian acceleration of an axis of $a_{Achse}$=250 mm/s$^2$. Consequently, a greater discretization error in the calculated acceleration is admissible here, without unwanted shutdowns arising.

The calculation of the second sampling interval $T_2$ follows herefrom:

$$T_2 = \sqrt{(4·e_p/e_a)} = \sqrt{4·0.25\mu m/s^2/1000000\mu m/s^2} = 1 \text{ ms} \quad (1.4)$$

Consequently, the second sampling interval is $T_2$=1 ms. Consequently, the reaction time of a second SLA function is $t_{r\_SLA2}=3.5·T_2=3.5$ ms.

Therefore, in the case of an inadmissible acceleration $a_2$ of the axis, the axial speed of the axis may rise to the value $v_{D\_2}$, with $v_{D\_2}=3.5$ ms·$a_2$.

As a consequence, the following relationship follows, particularly for the maximum controllable acceleration $a_2$ using the second sampling interval $T_2$:

$$a_2 = (v_D/v_{D\_2}) = (50 \text{ mm/s}/3.5 \text{ ms}) = 14.28 \text{ m/s}^2 \quad (1.5)$$

In summary, the Table 1 emerges for the present example when monitoring at least one current acceleration using the first instance of monitoring and the second instance of monitoring.

TABLE 1

| Acceleration limit value | Sampling interval | Reaction time | Controlled acceleration |
|---|---|---|---|
| 250 mm/s$^2$ | $T_1$ = 10 ms | $t_{r\_SLA1}$ = 35 ms | 1.428 m/s$^2$ |
| 1400 mm/s$^2$ | $T_2$ = 1 ms | $t_{r\_SLA2}$ = 3.5 ms | 14.28 m/s$^2$ |

In accordance with a further embodiment, the first acceleration limit value is less than the second acceleration limit value and the first sampling interval is greater than the second sampling interval. In particular, the smaller first acceleration limit value is assigned a larger first sampling interval and the larger second acceleration limit value is assigned a smaller second sampling interval.

In accordance with a further embodiment, a number G of further acceleration limit values are determined, in addition to the first and the second acceleration limit value, for monitoring the acceleration of the axis, with G≥1, where each further acceleration limit value is assigned a further sampling interval and all acceleration limit values are formed differently from one another.

A third acceleration limit value, which is assigned to a third sampling interval, or further acceleration limit values with further assigned sampling intervals are used, in particular, if more exact ascertainment of the actual acceleration and/or a control of greater accelerations are desired. Here, this further acceleration limit value, such as a third or a fourth acceleration limit value, is monitored, in particular, via a third instance of monitoring and a fourth instance of monitoring, in parallel and simultaneously with the first and the second instance of monitoring.

In accordance with a further embodiment, the second time interval is chosen as a filter time of a certain filter, where the certain filter particularly comprises a PT1 filter. In this further embodiment, a combination of monitoring of filtered and unfiltered accelerations, in particular, is performed.

In detail, this preferably means that an acceleration limit value is specified for the filtered acceleration. An acceleration limit value for the unfiltered acceleration is calculated such that a single acceleration pulse that is removed by the filter by filtering is not interpreted as a limit value infringement during the unfiltered monitoring either.

The advantage of the additional acceleration limit value monitoring using the unfiltered acceleration lies in the fact that an acceleration pulse that is higher than the first acceleration limit value $a_{G1}$ is identified as an acceleration overshoot, independently of the current filter state.

In particular, as an alternative or in addition to the PT1 filter, the specific filter comprises a low-pass filter of second order or higher, or a sliding averaging unit.

In accordance with a further embodiment, the first acceleration limit value $a_{Grenz}$ is calculated in step a) as a function of the second acceleration limit value $a_{Grenzfilter}$, the first sampling interval $T_{Abtast}$ and the second time interval $T_{Filter}$ in accordance with the following relationship:

$$a_{Grenz} = \frac{1}{1 - \left(\frac{1}{\exp\left(\frac{T_{Abtast}}{T_{Filter}}\right)}\right)} \cdot a_{Grenzfilter}$$

Here, the first acceleration limit value $a_{Grenz}$ is the acceleration limit value for the unfiltered acceleration, in particular. Here, the second acceleration limit value $a_{Grenzfilter}$ is the acceleration limit value for the filtered acceleration. The first sampling interval $T_{Abtast}$ is preferably only 1 ms, while the second time interval $T_{Filter}$ has a length of 10 ms.

It is also an object of the invention to provide a computer program product (i.e., a non-transitory computer readable medium) that causes the method, as explained above, to be performed on a program-controlled device.

A computer program product, such as a computer program means, for example, may be provided or delivered, for example, as a storage medium, such as a memory card, USB stick, CD-ROM, DVD, for example, or else in the form of a file downloadable from a server in a network. This may occurs, for example, in a wireless communication network through the transmission of an appropriate file comprising the computer program product or the computer program means.

It is also an object of the invention to provide an apparatus for monitoring an acceleration of a number A of axes of a multi-axis kinematic system using at least one sampling process with a first sampling interval. The apparatus comprises a determination unit for determining a first acceleration limit value assigned to the first sampling interval and a second acceleration limit value, differing therefrom, for the acceleration of the axis, wherein a second time interval is assigned to the second acceleration limit value, an ascertainment unit for ascertaining a plurality N of position values of the axis by sampling with a first sampling interval, a calculation unit for calculating at least a current acceleration via the ascertained N position values, and a monitoring unit for monitoring the calculated current acceleration via a first instance of monitoring using the first acceleration limit value and the assigned first sampling interval and, at the same time, via a second instance of monitoring using the second acceleration limit value and the assigned second time interval.

The respective unit, for example, the ascertainment unit or the calculation unit, may be implemented in the form of hardware and/or also in the form of software. In the case of an implementation in the form of hardware, the respective unit may be formed as an apparatus or as part of an apparatus, for example, as a computer or as a microprocessor or as a control computer of a vehicle. In the case of an implementation in the form of software, the respective unit may be formed as a computer program product, as a function, as a routine, as part of a program code or as an executable object.

The embodiments and features described for the proposed method apply accordingly to the proposed device.

It is also an object of the invention a machine having a number A of axes of the multi-axis kinematic system, where $A \geq 2$, in particular $A \geq 4$, where the current acceleration of each axis of the plurality A of axes of the multi-axis kinematic system of the machine is monitored via the apparatus.

In particular, the machine is formed as a robot, as a handling appliance or as a crane. One of the plurality A of axes of the machine, preferably of the robot, is an axis, in particular, to which an end effector is attached. Preferably, at least two of the number A of axes are interconnected.

The end effector (tool center point (TCP)) describes the tool position of an industrial robot. In particular, the end effector is an imaginary reference point that is situated at a suitable location on the tool of the industrial robot, in particular at the end of an axis.

Further possible implementations of the invention also include combinations of features or embodiments that have been described above or are described hereinafter with reference to the exemplary embodiments but have not been mentioned explicitly. In this case, a person skilled in the art will also add individual aspects as improvements or additions to the respective basic form of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further advantageous refinements and aspects of the invention are the subject matter of the dependent claims and of the exemplary embodiments, described below, of the invention. The invention is explained in more detail below on the basis of preferred embodiments with reference to the attached figures, in which:

FIG. 1 shows a schematic flow chart of an exemplary embodiment of a method for monitoring an acceleration of a number A of axes of a multi-axis kinematic system; and FIG. 2 shows a schematic block diagram of an apparatus for monitoring an acceleration of a number A of axes of a multi-axis kinematic system.

DETAILED DESCRIPTION OF THE EXEMPLARY EMBODIMENTS

In the figures, identical or functionally identical elements have been provided with the same reference signs, unless indicated otherwise.

FIG. 1 shows a schematic flow chart of an exemplary embodiment of a method for monitoring an acceleration of a number A of axes 14 of a multi-axis kinematic system 15 (see FIG. 2) using at least one sampling process with a first sampling interval.

In step S101, a first acceleration limit value assigned to the first sampling interval and a second acceleration limit value, differing therefrom, are determined for the acceleration of the axis 14. Here, a second time interval is assigned to the second acceleration limit value.

In step S101, the second acceleration limit value is determined based on the first acceleration limit value and the first sampling interval.

Further, the first acceleration limit value $a_{Grenz}$ is calculated in step S101 as a function of the second acceleration limit value $a_{Grenzfilter}$, the first sampling interval $T_{Abtast}$ and the second time interval $T_{Filter}$ in accordance with the following relationship:

$$a_{Grenz} = \frac{1}{1 - \left(\frac{1}{\left(\exp\left(\frac{T_{Abtast}}{T_{Filter}}\right)\right)}\right)} \cdot a_{Grenzfilter}$$

In step S102, a plurality N of position values of the axis 14 are ascertained by sampling with the first sampling interval. Here, the plurality N of position values of the axis 14 comprise N≥3 position values. Moreover, the plurality N of position values are ascertained using at least one position encoder.

Next, at least one current acceleration is calculated in step S103 by means of the ascertained N position values. The plurality N of position values comprises N≥3 position values. In step S103, the current acceleration is calculated, in particular, based on a calculated difference between a first and a second calculated speed value and the first sampling interval and/or the second time interval. Here, the first and second speed value are calculated from the plurality N of position values. The position values of mutually adjacent sampling values of a sampling sequence are ascertained here by sampling with the first sampling interval.

In step S104, the calculated current acceleration is monitored via a first instance of monitoring using the first acceleration limit value and the assigned first sampling interval and, at the same time, via a second instance of monitoring using the second acceleration limit value and the assigned second time interval.

Additionally, in step S104, the calculated current acceleration is compared in each case with the first acceleration limit value used in the first instance of monitoring and with the second acceleration limit value used in the second instance of monitoring in order to ascertain whether the calculated current acceleration exceeds the first and/or the second acceleration limit value.

Furthermore, an action is performed in a step not illustrated here, depending on whether the calculated current acceleration exceeds the first or the second acceleration limit value. Here, the action comprises at least the stopping of the axis 14.

In particular, the second time interval is formed as a second sampling interval. Here, a plurality M of position values of the axis 14, with M≥3, are ascertained via sampling with a second sampling interval.

Further, the first acceleration limit value is smaller than the second acceleration limit value. Moreover, the first sampling interval is greater than the second sampling interval.

Likewise, a number G of further acceleration limit values are determined, in addition to the first and second acceleration limit value, for the purposes of monitoring the acceleration of the axis 14, with G≥1. Here, each further acceleration limit value is assigned a further sampling interval and all acceleration limit values have different embodiments from one another.

Alternatively, the second time interval is selected as a filter time of a certain filter, where the certain filter comprises a PT1 filter, in particular.

FIG. 2 shows a schematic flow chart of an apparatus 100 for monitoring an acceleration of a number A of axes 14 of the multi-axis kinematic system 15 using at least one sampling process with a first sampling interval.

The apparatus 100 of FIG. 2 comprises a determination unit 10, an ascertainment unit 11, a calculation unit 12 and a monitoring unit 13.

The determination unit 10 is configured to determine a first acceleration limit value assigned to the first sampling interval and a second acceleration limit value, differing therefrom, for the acceleration of the axis 14. Here, the second acceleration limit value is assigned to a second time interval.

The ascertainment unit 11 is configured to ascertain a plurality N of position values of the axis 14 by sampling with the first sampling interval.

Furthermore, the calculation unit 12 is configured to calculate at least one current acceleration via the ascertained N position values.

The monitoring unit 13 is configured to monitor the calculated current acceleration via a first instance of monitoring using the first acceleration limit value and the assigned first sampling interval and, at the same time, via a second instance of monitoring using the second acceleration limit value and the assigned second time interval.

Furthermore, FIG. 2 shows a machine, in particular a robot 16, having the apparatus 100 and having the plurality A of axes 14 of the multi-axis kinematic system 15. The number A of axes 14 is A≥2, in particular A≥4, where the number A of axes 14 shown in FIG. 2 is A≥2.

The current acceleration of each axis 14 from the number A of axes 14 of the multi-axis kinematic system 15 of the robot 16 is monitored via the apparatus 100.

Although the present invention has been described on the basis of exemplary embodiments, it is able to be modified in many ways.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring an acceleration of a plurality A of axes of a multi-axis kinematic system utilizing at least one sampling process with a first sampling interval, the method comprising:
   a) determining a first acceleration limit value assigned to a first sampling interval and a second acceleration limit value, differing therefrom, for the acceleration of an axis of the plurality A of axes, wherein a second time interval is assigned to the second acceleration limit value;

b) ascertaining a plurality N of position values of each of the plurality A of axes by sampling with the first sampling interval;

c) calculating at least one current acceleration via the ascertained plurality N of position values; and d) monitoring the calculated at least one current acceleration via a first instance of monitoring utilizing the first acceleration limit value and the assigned first sampling interval and, at the same time, via a second instance of monitoring utilizing the second acceleration limit value and the assigned second time interval.

2. The method as claimed in claim 1, wherein said step d) comprises:

comparing each calculated current acceleration with the first acceleration limit value utilized in a first instance of monitoring and with the second acceleration limit value limit value in a second instance of monitoring to ascertain whether the calculated current acceleration exceeds at least one of (i) the first limit value and (ii) the second acceleration limit value.

3. The method as claimed in claim 2, wherein an action is performed in step e) depending on whether the calculated current acceleration exceeds at least one of (i) the first acceleration limit value and (ii) the second acceleration limit value; and wherein the action comprises at least a stopping of the axis of the plurality A of axes.

4. The method as claimed in claim 1, wherein the plurality N of position values of each of the plurality A of axes, with N≥3, are ascertained in step b) by sampling with the first sampling interval; and wherein the ascertainment of the plurality N of position values is performed utilizing at least one position encoder.

5. The method as claimed in claim 2, wherein the plurality N of position values of each of the plurality A of axes, with N≥3, are ascertained in step b) by sampling with the first sampling interval; and wherein the ascertainment of the plurality N of position values is performed utilizing at least one position encoder.

6. The method as claimed in claim 3, wherein the plurality N of position values of each of the plurality A of axes, with N≥3, are ascertained in step b) by sampling with the first sampling interval; and wherein the ascertainment of the plurality N of position values is performed utilizing at least one position encoder.

7. The method as claimed in claim 1, wherein the second acceleration limit value in step a) is determined based on the first acceleration limit value and the first sampling interval.

8. The method as claimed in claim 4, wherein the current acceleration in step c) is calculated via the ascertained plurality N of position values, with N≥3; and wherein the current acceleration is calculated based on a calculated difference between first and second calculated speed values and at least one of (i) the first sampling interval and (ii) the second time interval.

9. The method as claimed in claim 7, wherein the current acceleration in step c) is calculated via the ascertained plurality N of position values, with N≥3; and wherein the current acceleration is calculated based on a calculated difference between first and second calculated speed values and at least one of (i) the first sampling interval and (ii) the second time interval.

10. The method as claimed in claim 7, wherein the first and the second speed values are each calculated from the plurality N the position values; and wherein position values of mutually adjacent sampling values of a sampling sequence are ascertained via sampling with the first sampling interval.

11. The method as claimed in claim 1, wherein the second time interval is formed as a second sampling interval, in which a plurality M of position values of each axis of the plurality A of axes are ascertained via sampling with the second sampling interval, with M≥3.

12. The method as claimed in claim 11, wherein the first acceleration limit value is less than the second acceleration limit value and the first sampling interval is greater than the second sampling interval.

13. The method as claimed in claim 1, further comprising:

determining a plurality G of further acceleration limit values, in addition to the first and the second acceleration limit value, for monitoring the acceleration of the axis of the plurality A of axes, with G≥1;

wherein each further acceleration limit value is assigned a further sampling interval and all acceleration limit values are formed differently from one another.

14. The method as claimed in claim 7, wherein the second time interval is selected as a filter time of a certain filter.

15. The method as claimed in claim 7, wherein the certain filter comprises a PT1 filter.

16. The method as claimed in claim 12, wherein the first acceleration limit value $a_{Grenz}$ is calculated in step a) in accordance with the following relationship:

$$a_{Grenz} = \frac{1}{1 - \left(\frac{1}{\exp\left(\frac{T_{Abtast}}{T_{Filter}}\right)}\right)} \cdot a_{Grenzfilter}$$

wherein $a_{Grenzfilter}$ is the second acceleration limit value, $T_{Abtast}$ is the first sampling interval and $T_{Filter}$ is the second time interval.

17. A non-transitory computer-readable medium encoded with a computer program which, when executed by a program-controlled device, causes monitoring of an acceleration of a plurality A of axes of a multi-axis kinematic system utilizing at least one sampling process with a first sampling interval, the computer program comprising:

a) program code for determining a first acceleration limit value assigned to a first sampling interval and a second acceleration limit value, differing therefrom, for the acceleration of an axis of the plurality A of axes, a second time interval being assigned to the second acceleration limit value;

b) program code for ascertaining a plurality N of position values of each of the plurality A of axes by sampling with the first sampling interval;

c) program code for calculating at least one current acceleration via the ascertained plurality N of position values; and d) program code for monitoring the calculated at least one current acceleration via a first instance of monitoring utilizing the first acceleration limit value and the assigned first sampling interval and, at the same time, via a second instance of monitoring utilizing the second acceleration limit value and the assigned second time interval.

18. An apparatus for monitoring an acceleration of a plurality A of axes of a multi-axis kinematic system utilizing at least one sampling process with a first sampling interval, the apparatus comprising:

a determiner unit for determining a first acceleration limit value assigned to the first sampling interval and a second acceleration limit value, differing therefrom, for acceleration of an axis of the plurality A of axes, a second time interval being assigned to the second acceleration limit value;

an ascertainer for ascertaining a plurality N of position values of the axis of the plurality A of axes by sampling with the first sampling interval;

a calculator for calculating at least a current acceleration via the ascertained plurality N of position values; and a monitor for monitoring the calculated current acceleration via a first instance of monitoring utilizing the first acceleration limit value and the assigned first sampling interval and, simultaneously, via a second instance of monitoring utilizing the second acceleration limit value and the assigned second time interval.

19. A machine having the apparatus as claimed in claim 18 and having the plurality A of axes of the multi-axis kinematic system, where $A \geq 2$;

wherein the current acceleration of each axis of the plurality A of axes of the multi-axis kinematic system of the machine is monitored via the apparatus.

20. The machine having the apparatus as claimed in claim 19, wherein $A \geq 4$.

* * * * *